United States Patent Office 2,957,798
Patented Oct. 25, 1960

2,957,798

PRODUCTION OF DISPERSIBLE SULFUR-CONTAINING PRODUCTS, SUITABLE FOR THE PURPOSE OF PLANT PROTECTION

William Hennicke, Mannheim-Feudenheim, Germany, assignor to Badische Anilin- & Soda-Fabrik Aktiengesellschaft, Ludwigshafen (Rhine), Germany No Drawing. Filed Nov. 23, 1956, Ser. No. 623,815

Claims priority, application Germany Dec. 1, 1955

2 Claims. (Cl. 167—20)

This invention relates to a method for preparing products containing dispersible sulfur which especially are suitable for the purpose of plant protection.

In the production of sulfur which can be dispersed well in water, in particular for the purpose of plant protection, it is known that it is possible to start from crystalline sulfur which in various ways, for example by grinding in colloid mills, or stirring fused sulfur into solutions containing protective colloids, is brought into a dispersible form similar to a colloid. By dry grinding alone, even to an extreme fineness, it is not possible to render dispersible pure crystalline sulfur.

I have now found that dispersible sulfur, in particular for the purpose of plant protection, can be replaced to a great extent by the cheaper crystalline sulfur obtainable without expenditure on apparatus, by the dry grinding of mixtures of dispersible sulfur and crystalline sulfur. This grinding can be carried out in pin mills, jet mills and the like. The proportion of crystalline sulfur is measured according to the properties desired in the end product in any case.

To the mixtures there may also be added diluents, dispersing agents, wetting agents and the like and/or other plant protection agents, for example copper oxychloride, thiuram disulfides, 1,2,3,4,10,10a-hexachlor-1,4,5,8 - di - endomethylene - 1,4,4α,5,8,8α - hexahydronaphthalene or hexachlorcyclohexane. When adding such substances in an amount of about 10% of the weight of sulfur or more, up to about 80% by weight of the dispersible sulfur may be replaced by crystalline sulfur, without the properties which are determinative for the usefulness of the product, in particular floating power, dispersibility and storability, undergoing any worsening. In the case of products containing only sulfur, the influence of the crystalline sulfur is more strongly noticeable, but even in this case the floating value, for example, of the mixture is always clearly higher than that which is calculated from the given proportions of the two components.

The partial replacement of the dispersible sulfur by crystalline sulfur according to this invention not only renders possible a cheapening of the raw material but also has advantages in production. Thus it is not necessary to remove from the dispersible sulfur as much water as would otherwise be necessary because by admixture with the absolutely dry crystalline sulfur the moisture content of the mixture is already lowered.

As the dispersible sulfur there may be used sulfur prepared by any known method, as for example by boiling polysulfide solutions or by other methods from such solutions. The crystalline sulfur may originate from gas purification masses or may be of natural origin. It is preferably subjected to a coarse grinding prior to its use.

In the following examples, which are given to illustrate but not to limit the invention, the "floating value" of the products obtained is determined by the methods described in "Nachrichtenblatt der Biologischen Zentralanstalt," Braunschweig, vol. 1, page 107 (1949). The parts are by weight.

*Example 1*

An ammonium polysulfide solution is prepared by regenerating with ammonium sulfide solution an active carbon laden with sulfur. Part of the resultant solution is boiled in the presence of a protective colloid and the other part without any addition. In the first case dispersible sulfur is obtained and in the second case ordinary crystalline sulfur. The dispersible sulfur is separated from the greater part of the water by sedimentation and dried until its water content amounts to about 13%. The crystalline sulfur first obtained as a melt is allowed to cool, broken up and ground coarsely. 20 parts of the dispersible sulfur are mixed with 80 parts of the crystalline sulfur. To the mixture there are also added 14 parts of sodium lignin sulfonate, 6 parts of rock salt, 3.1 parts of sodium bisulfite and 5.1 parts of ammonium bicarbonate. By grinding this mixture in a pin mill, a product is obtained having a floating value of 68.5. By grinding in a jet mill, a product having a floating value of 79.0 may be obtained.

*Example 2*

The following mixtures of dispersible and crystalline sulfur obtainable according to Example 1 are prepared, the water content of the dispersible sulfur being 8.2% in each case. The mixtures are comminuted in a pin mill. The products thus obtained have the following floating values in the mixing proportions specified:

50 parts of dispersible and 50 parts of crystalline sulfur _____ 64.1
30 parts of dispersible and 70 parts of crystalline sulfur _____ 36.4
Dispersible sulfur alone _____ 65.0
Crystalline sulfur alone _____ 0.0

I claim:
1. A process for the production of dispersible sulfur-containing products suitable for plant protection purposes and having a floating value of at least 36 which comprises mixing crystalline sulfur and dispersible sulfur in such a ratio that the crytsalline sulfur amounts to at most 80 percent by weight of the total sulfur and subjecting this mixture to a dry grinding in one of a pin mill and a jet mill.
2. A process for the production of dispersible sulfur-containing products suitable for plant protection purposes and having a floating value of at least 36 which comprises subjecting to a dry grinding in one of a pin mill and a jet mill a mixture of crystalline and dispersible sulfur containing up to 80 percent by weight of crystalline sulfur in the presence of a lignin sulfonate in an amount of at least 10 percent by weight of the said mixture.

References Cited in the file of this patent

UNITED STATES PATENTS

| | | |
|---|---|---|
| 1,611,939 | Noyes | Dec. 28, 1926 |
| 1,699,694 | Ellis | Jan. 22, 1929 |
| 1,813,497 | Koppe | July 7, 1931 |
| 1,939,403 | Nagelvoort | Dec. 12, 1933 |
| 2,060,311 | Hashimoto | Nov. 10, 1936 |
| 2,348,736 | Heath | May 16, 1944 |